(12) United States Patent
Boller et al.

(10) Patent No.: US 12,544,973 B2
(45) Date of Patent: Feb. 10, 2026

(54) SYSTEM FOR CURING AND/OR INSPECTING A PIPELINE LINING AND METHOD FOR CURING AND/OR INSPECTING A PIPELINE LINING

(71) Applicant: BODUS GMBH, Aarau (CH)

(72) Inventors: Daniel Boller, Aarau (CH); Klaus Werner, Aarau (CH); Joao Carlos Gomes Cancio, Aarau (CH)

(73) Assignee: BODUS GMBH, Aarau (CH)

( * ) Notice: Subject to any disclaimer, the term of this patent is extended or adjusted under 35 U.S.C. 154(b) by 184 days.

(21) Appl. No.: 17/786,216

(22) PCT Filed: Dec. 16, 2020

(86) PCT No.: PCT/EP2020/086537
§ 371 (c)(1),
(2) Date: Jun. 16, 2022

(87) PCT Pub. No.: WO2021/122825
PCT Pub. Date: Jun. 24, 2021

(65) Prior Publication Data
US 2023/0018832 A1     Jan. 19, 2023

(30) Foreign Application Priority Data

Dec. 18, 2019   (EP) .................................... 19217632

(51) Int. Cl.
| F16L 58/10 | (2006.01) |
| B29C 63/00 | (2006.01) |
| B29C 63/34 | (2006.01) |
| F16L 55/18 | (2006.01) |
| B29K 309/08 | (2006.01) |
| B29L 23/00 | (2006.01) |
| F16L 101/18 | (2006.01) |
| F16L 101/30 | (2006.01) |

(52) U.S. Cl.
CPC ........ B29C 63/0004 (2013.01); B29C 63/341 (2013.01); F16L 58/1009 (2013.01); *B29K 2309/08* (2013.01); *B29L 2023/22* (2013.01); *F16L 2101/18* (2013.01); *F16L 2101/30* (2013.01)

(58) Field of Classification Search
CPC .................................................. F16L 58/1009
See application file for complete search history.

(56) References Cited

U.S. PATENT DOCUMENTS

| 4,009,063 A | 2/1977 | Wood |
| 6,679,966 B1 * | 1/2004 | Brandenburger ... F16L 55/1656 156/190 |
| 7,852,091 B2 | 12/2010 | Sinha |
| 10,359,143 B2 | 7/2019 | Parker |
| 2019/0226620 A1 * | 7/2019 | Weisenberg ........ F16L 55/1645 |

FOREIGN PATENT DOCUMENTS

| CN | 108843892 A | 11/2018 |
| DE | 69503917 T2 | 1/1999 |
| DE | 10049101 C1 | 4/2002 |
| EP | 0459177 A2 * | 12/1999 |
| EP | 2831484 A1 | 2/2015 |
| JP | 2001-137752 A * | 5/2001 |
| KR | 10-1411261 B * | 6/2014 |
| WO | WO-84/03928 A1 * | 10/1984 |
| WO | WO-92/16784 A1 * | 10/1992 |
| WO | WO-96/12605 A1 * | 5/1996 |
| WO | WO-2018/145863 A1 * | 8/2018 |

OTHER PUBLICATIONS

International Search Report for Application No. PCT/EP2020/086537, mailed Mar. 11, 2021, 4 pages.

* cited by examiner

*Primary Examiner* — Jeffry H Aftergut
(74) *Attorney, Agent, or Firm* — Lippes Mathias LLP

(57) ABSTRACT

The invention relates to a system (10) for curing and/or inspecting a pipeline lining (30) positioned in a pipeline (20), the pipeline lining (30) comprising an outer plastics material layer and an inner fiber composite layer, the fiber composite layer comprising a plastics material which is to be cured and/or which is at least partially cured. In accordance with the invention, the system (10) comprises at least one high-frequency unit (40) which comprises at least one microwave-generator unit (41) and at least one microwave-transmitting antenna (42) for curing a plastics material which is to be cured, at least the at least one microwave-transmitting antenna (42) being movable in the pipeline (20) by means of a transporting device (60).

22 Claims, 1 Drawing Sheet

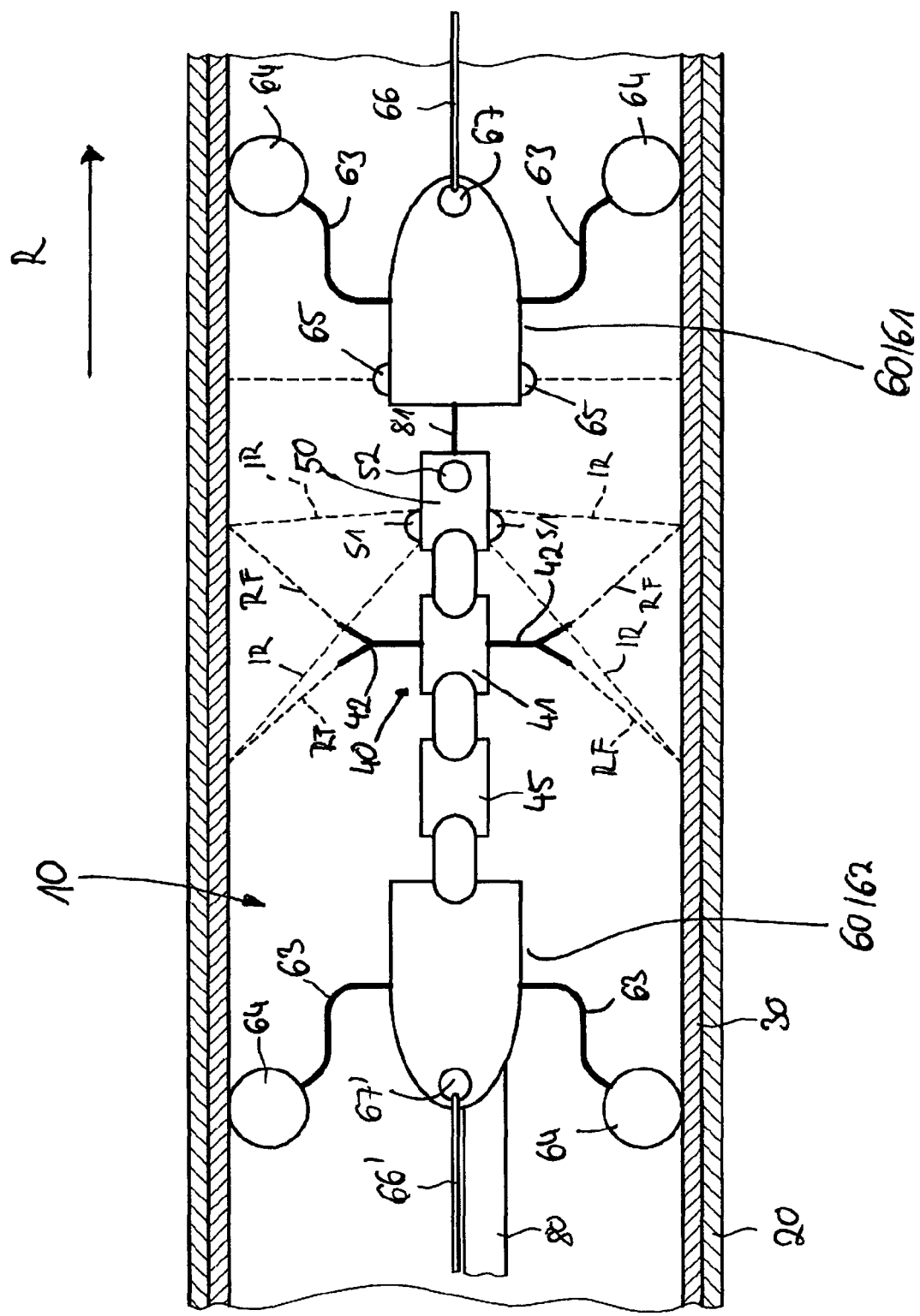

SYSTEM FOR CURING AND/OR INSPECTING A PIPELINE LINING AND METHOD FOR CURING AND/OR INSPECTING A PIPELINE LINING

The invention relates to a system for curing and/or inspecting a pipeline lining positioned in a pipeline, wherein the pipeline lining has an outer plastics material layer and an inner fibre composite layer, wherein the fibre composite layer comprises a plastics material which is to be cured and/or has been at least partially cured. The invention additionally relates to a method for curing and/or inspecting a pipeline lining positioned in a pipeline, wherein the pipeline lining has an outer plastics material layer and an inner fibre composite layer, wherein the fibre composite layer comprises a plastics material which is to be cured and/or has been at least partially cured and the method is carried out using a system according to the invention.

It is known from the prior art to provide pipelines internally with a pipeline lining which has an outer plastics material layer and an inner fiber composite layer.

It is known to cure pipeline linings of this construction, especially the associated fiber composite layer, by means of a steam system.

When curing the pipeline linings, especially when curing the fiber composite layer, using a steam method, the curing times are not usually satisfactory. In addition, complex apparatus set-ups for generating the steam have to be provided in order to carry out a steam curing process.

Furthermore, systems of this construction which are based on the use of microwave technology are known from the prior art. These systems are based in each case on the use of a magnetron. However, the use of a magnetron of this construction is associated with several disadvantages. In order to generate and correspondingly output microwaves by means of a magnetron, it is necessary to provide a waveguide element. Waveguide elements of this construction, however, are of such a size that, for example, use of such systems in pipes with a diameter smaller than 100 mm is not possible. Use in bent pipe portions is also only possible from bend radii of 200 mm.

Furthermore, systems which have a magnetron often have to be cooled by means of complex water- or air-cooling systems. Especially, depending on the design and form of the antennas of the known systems, it is often necessary to use complex closed water-cooling devices.

A further significant disadvantage in respect of previously known systems for applying microwave energy in order to cure pipeline linings lies in the fact that the antennas of the systems have to be guided in an exactly centred manner in order to avoid different applications of energy. With corresponding deviations in bend profiles and/or with changes in respect of the diameter of the pipes to be lined, however, an antenna can no longer be guided in an exactly centred manner, which may thus lead to uncontrolled curing at these points. It is possible that too little or too much microwave energy is delivered to the corresponding portion of the pipeline lining.

It is therefore the aim of the present invention to describe a further-developed system for curing and/or inspecting a pipeline lining positioned in a pipeline, wherein the system is intended to be more easily handled.

Furthermore, the time required correspondingly to cure the pipeline is to be effectively reduced with the aid of a further-developed system.

In addition, an exact control of the application of energy to a pipeline lining positioned in a pipeline is to be made possible with the aid of a further-developed system. Especially, with the aid of the system according to the invention, it is to be made possible to allow reliable curing of a pipeline lining also in bent portions of a pipe as well as in portions having different diameters or in pipe connection regions.

A further desire in respect of a further-developed system lies in the fact that this system to be used not only to cure a pipeline, but also to inspect the pipeline. With the aid of a further-developed system, a system is thus to be provided, with use of which an inspection in respect of the at least partially cured plastics material can be carried out, for example after the curing process.

A further aim of the present invention is to describe a further-developed method for curing and/or inspecting a pipeline lining, wherein the curing time of the pipeline lining is to be reduced with the aid of the method according to the invention.

Furthermore, with the aid of a further-developed method, a section-by-section control in respect of the application of energy to the pipeline lining to be cured is to be made possible.

The explained aim in respect of the system for curing and/or inspecting a pipeline lining positioned in a pipeline is addressed in accordance with the invention by the subject matter of claim 1 and in respect of the method for curing and/or inspecting a pipeline lining positioned in a pipeline by the subject matter of claim 16.

The invention is based on the notion of describing a system for curing and/or inspecting a pipeline lining positioned in a pipeline, wherein the pipeline lining has an outer plastics material layer and an inner fiber composite layer, wherein the fiber composite layer comprises a plastics material which is to be cured and/or has been at least partially cured. In accordance with the invention, the system has at least one high-frequency unit, which has at least one microwave-generator unit and at least one microwave-transmitting antenna for curing a plastics material to be cured, wherein at least the at least one microwave-transmitting antenna is movable in the pipeline by means of a transporting device.

The system is therefore suitable both for curing plastics materials of a fiber composite layer of a pipeline lining and for inspecting a pipeline lining comprising cured or at least partially cured plastics material.

The pipeline can be any pipeline. Especially, it can be a pipeline in the sewerage sector. For example, the pipeline can be an in-house line and/or a property drainage line and/or a collection line and/or a branch collar and/or a T-piece. The pipeline can have any pipe diameter and/or geometry here.

The pipelines are preferably already laid or installed at the time of use of the system. However, it is also possible that the system is used when pipelines have not yet been installed or laid.

In accordance with the invention, the system comprises the at least one high-frequency unit, the at least one microwave-generator unit, and at least one microwave-transmitting antenna.

The high-frequency unit can be such a unit that structurally combines with one another the microwave-generator unit and the at least one microwave-transmitting antenna. It is furthermore possible that the microwave-generator unit and the at least one microwave-transmitting antenna are structurally separate from one another and are connected to one another merely by a line or a cable.

At least the at least one microwave-transmitting antenna is movable in the pipeline by means of a transporting device.

This is necessary especially if the microwave-generator unit is formed structurally separately from the at least one microwave-transmitting antenna. It is therefore possible that the microwave-generator unit remains outside the pipeline, whereas the at least one microwave-transmitting antenna is movable or is moved in the pipeline by means of at least one transporting device.

The system parts located in the pipeline during use of the system can be referred to as a pipeline module. The pipeline module comprises at least one microwave-transmitting antenna and at least one transporting device. The microwave-generator unit is not necessarily formed as part of the pipeline module. It is possible that the pipeline module comprises all component parts of the system.

On the one hand, forming a high-frequency unit with a microwave-transmitting antenna has the advantage that a curing process can be carried out more quickly in respect of the curing of plastics material in pipelines in comparison to known processes. On the other hand, the system, on account of the forming of a microwave-transmitting antenna, can be used at the same time to inspect a pipeline or a pipeline lining in respect of the degree of curing of a plastics material. The system consequently comprises component parts that have smaller dimensions and that additionally are more easily handled.

The high-frequency unit of the system according to the invention can comprise at least two microwave-generator units, especially at least three microwave-generator units, especially at least four microwave-generator units. In other words, it is possible that the high-frequency unit has at least two microwave-generator units, especially at least three microwave-generator units, especially at least four microwave-generator units. With an increasing number of microwave-generator units, it is possible to use a plurality of high-performance microwave-transmitting antennas.

The high-frequency unit preferably has a plurality of microwave-generator units and a plurality of microwave-transmitting antennas. The high-frequency unit especially preferably has the same number of microwave-generator units and microwave-transmitting antennas.

The at least one microwave-generator unit can generate 100-1000 watts of microwave power. It is especially preferred if a microwave-generator unit generates at least 500 watts of microwave power.

The high-frequency unit can also be formed as a solid-state high-frequency unit or as a solid-state microwave unit. Here, the term "solid-state" relates to the semiconductor components of the units used to generate a high frequency or microwaves.

The at least one microwave-generator unit is preferably a solid-state microwave-generator unit. In other words, the microwave-generator unit is at least one solid-state microwave generator.

The design as a solid-state microwave generator is associated with a number of advantages. On the one hand, it is possible to dispense with previously known waveguide elements, as are known when using a magnetron. With the aid of a system according to the invention, it is therefore possible to use this system also in pipelines having small dimensions as well as in pipelines having bends and/or having bent portions. Furthermore, it is especially advantageous that a solid-state microwave generator or a solid-state microwave-generator unit can be easily controlled in respect of its power. Furthermore, the actually emitted power of a solid-state microwave-generator unit can be easily detected. It is therefore possible to perform at any time a simple process monitoring or control for a method, associated with the system, for curing and inspecting a pipeline lining positioned in a pipeline.

In a preferred embodiment of the invention, the system, especially the high-frequency unit, comprises at least three microwave-transmitting antennas.

In a further preferred embodiment of the invention, the high-frequency unit comprises one microwave-generator unit per microwave-transmitting antenna. This makes it possible to provide sufficient microwave power per microwave-transmitting antenna.

It is possible that the high-frequency unit comprises at least one semiconductor-based microwave-generator unit. The semiconductor-based microwave-generator unit is especially preferably the solid-state microwave-generator unit already described. The advantage of a semiconductor-based microwave-generator unit in comparison to a vacuum-tube-based microwave-generator unit lies especially in the resultant improved possibility for controlling the generated power and frequency. In other words, on account of the use of a semiconductor-based microwave-generator unit, it is possible to adjust and thus efficiently introduce the generated high-frequency energy.

It is additionally possible that the pipeline lining, especially the plastics material, is cured by means of fluid curing. Thus, a combination of fluid curing and application of high-frequency energy can be provided in order to cure the pipeline lining.

The combination can be implemented simultaneously or chronologically in succession.

Examples of fluid curing are understood to be, for example, heating by means of steam and/or hot air and/or hot water, or for example cold curing.

Furthermore, it is possible that the system has at least one infrared sensor and/or at least one temperature sensor and/or at least one pressure sensor and/or at least one moisture sensor and/or at least one position sensor and/or at least one travel measurement sensor and/or at least one gyro sensor.

In one embodiment of the invention it is possible that said sensors are formed as part of a sensor unit. It is furthermore possible that said sensors are formed on different portions of the system according to the invention.

It is furthermore possible that the sensor unit comprises only one of said sensors. The sensor unit especially preferably comprises at least one infrared sensor.

An infrared sensor preferably measures the surface temperature of the pipeline lining. On the one hand, this makes it possible to inspect the curing process to be carried out. On the other hand, the sensed temperature for example can be recorded or stored.

Preferably, a measurement of the ambient temperature is carried out by means of the temperature sensor. This is used for example to control the curing process. A recording of the ambient temperatures that prevail during the curing process is also advantageous.

With the aid of the at least one pressure sensor and/or the at least one moisture sensor, pressure and/or moisture measurements in respect of the surrounding environment are also carried out. These values can also be used to control the curing process.

With the aid of the travel measurement sensor and/or the position sensor, the position of the system parts or of the pipeline module located in the pipeline can be measured.

The provision of at least one gyro sensor also allows the spatial position of the system parts that are located in the pipeline to be detected.

The sensors that are used to detect the position or travelled distance of individual parts of the system or of the pipeline module in the pipeline have the advantage that a user of the system according to the invention knows at all times, while carrying out a curing and/or an inspection process, at what point of the pipeline parts of the system according to the invention are located, the pipeline being not otherwise visible.

In one embodiment of the system according to the invention, it is possible that the transporting device comprises at least one front portion and at least one rear portion, wherein the front portion and the rear portion can be structurally separate from one another. The front portion and the rear portion are preferably parts of the pipeline module.

The front portion of the transporting device is understood to be the portion that in the state of use is introduced as first element into a pipeline. In other words, the front portion is formed as the first element in the direction of movement of the parts located inside the pipeline.

The rear portion is understood to be a portion that forms a rear endpiece of the transporting device. In the state of use, the rear portion is the portion of the transporting device or the portion of the system parts located in the pipeline which, looking towards the rear and as viewed in the direction of movement of the system, forms the last element.

With a design of this construction of the transporting device, it is additionally possible that at least one intermediate portion is formed between the front portion and the rear portion. It is possible that a plurality of intermediate portions, which again are structurally separate from one another, are formed between the front portion and the rear portion. The at least one intermediate portion is preferably formed structurally separately both from the front portion and from the rear portion.

If a plurality of intermediate portions are provided, it is possible that the different intermediate portions are assigned different functions. For example, it is possible that one intermediate portion comprises at least one microwave-transmitting antenna, whereas one intermediate portion comprises sensors and/or parts of a sensor unit. Due to the provision of a plurality of intermediate portions, it is possible to combine different intermediate portions with one another selectively. It is therefore possible to extend and/or reduce the system depending on the structural conditions.

The front portion and/or the rear portion preferably has at least two, preferably at least three leg elements. Both the front portion and the rear portion preferably have at least two leg elements each. If intermediate portions are provided, it is possible that at least one intermediate portion also has at least two leg elements.

The leg elements are preferably biased by means of a spring. The leg elements are preferably formed in such a way that the radius or diameter formed on account of the leg elements can be adjusted to the diameter of the pipeline that is to be worked on and/or that is to be inspected. Especially, the leg elements are to be formed in such a way that, on account of a bias, which is realised especially by means of springs, the radii/diameters produced by the leg elements can be adjusted while a process is being carried out, depending on, for example, pipe bends formed in the pipeline and/or nominal diameter changes.

A roller and/or a wheel and/or a tyre and/or a caterpillar track is preferably secured to all leg elements of the system according to the invention. The forming of such elements at an end of a leg element allows a simple movement of the front portion and/or of the rear portion and/or of an intermediate portion possibly present.

In a further embodiment of the invention it is possible that at least one bellows is formed in order to centre a transporting device and/or system parts located in a pipeline and/or a pipeline module. Instead of leg elements, the system component parts, especially in the case of smaller pipe diameters, can be oriented and/or centred by means of at least one bellows.

By contrast, the described leg elements are preferably provided in the case of larger nominal diameters of pipelines, typically from nominal diameters of 200 mm. Alternatively and/or additionally, it is possible that at least two radially designed brushes or at least two springs are provided for centring.

The system according to the invention can have at least one camera. The at least one camera is preferably formed with a lighting unit. The at least one camera can be provided in the region of the front portion and/or in the region of the rear portion.

A camera provided in the region of the front portion is preferably configured to be looking towards the front. A camera provided in the region of the rear portion is preferably designed to be looking towards the rear. The references "towards the front" and "towards the rear" are to be understood in relation to the direction of movement of the system component parts located in the pipeline.

In a further embodiment of the invention it is possible that the transporting device has at least one traction wire, wherein at least one fastening device is configured for attachment of the traction wire.

In a possible embodiment of the invention, it is possible that the system according to the invention has two fastening devices, especially two eyelets, for traction wires.

A fastening device, especially an eyelet, is preferably provided in the front region of the component part located at the front in the state of use in the pipeline, especially is provided in the region of the front portion. In order to be able to remove the device from the pipeline, a fastening device, especially an eyelet, for a traction wire is furthermore provided at the rear end, especially at the rear portion of the system. An arrangement of this construction of the traction wire causes the elements located in the pipeline to be able to be removed from the pipeline once the curing has been performed and/or once the inspection process has been performed.

In a further embodiment of the invention, it is possible that the transporting device comprises a pusher device, especially a pusher wire. This pusher device is preferably attached at the rear end, especially preferably to the rear portion, of the system. Parts of the device or parts of the system can be pushed into the pipeline and then removed with the aid of a pusher system.

The provision of a pusher device is advantageous especially if the at least one microwave-generator unit remains outside the pipeline and merely at least a microwave-transmitting antenna of the high-frequency unit is introduced into the pipeline. In such an embodiment of the invention, the system part that is introduced into the pipeline therefore comprises the at least one microwave-transmitting antenna and preferably additionally sensor systems or sensors. The device to be introduced into the pipeline in this case has, for example, a spherical head shape or an egg shape. A design of this construction of the pipeline module has the advantage that the latter can be introduced very easily into the pipeline and moved therein.

It is furthermore possible that part of the transporting device is a deflection pulley at the end of a liner and/or at the end of a calibration hose and/or at the end of a liner end cap.

The system according to the invention can additionally comprise an end fitting for mounting of the system part to be introduced into the pipeline and also for mounting of the liner/calibration hose assembly.

It is possible that the system according to the invention has a construction of casing and/or balloon, wherein the at least one microwave-antenna and optionally the sensors or sensor are located in this balloon/casing.

The casing/balloon is formed in such a way that the pipeline lining can be pressed outwardly against the pipeline. An embodiment of this construction of the system according to the invention facilitates the positioning of the pipeline lining in the pipeline, wherein the pipeline lining can be cured in the same step.

In a further embodiment of the invention, the system can comprise a position-determining unit. The position-determining unit can be a LIDAR system and/or an ultrasound system and/or an image acquisition unit and/or an encoder on a/the traction wire of the transporting device. With the aid of a position-determining unit of this construction, the user of the system according to the invention can know at all times at what position of the pipeline the parts of the system (pipeline module) that have been introduced into the pipeline are located.

The plastics material which is to be cured and/or which is at least partially cured of the fiber composite layer can be a thermosetting plastics material, especially an epoxy resin or an unsaturated polyester resin (UP resin) or vinyl ester (BE).

In a further embodiment of the invention, it is possible that the fiber composite layer comprises glass fibers.

The system can additionally comprise a diameter-sensing unit, especially an optical diameter-sensing unit or an ultrasound diameter-sensing unit. The data sensed by the diameter-sensing unit can be used especially to control the curing process. Furthermore, it is possible that the values sensed by the diameter-sensing unit are used to adjust any provided leg elements and/or for quality control. In conjunction with the quality control, it is possible for example with the aid of the diameter-sensing unit to detect defects or dents or narrow points or branch points. In a spincoat method, the applied layer thickness can also be measured or detected directly using the device introduced into the pipeline.

The pipeline lining is preferably hose-like and/or sock-like. When forming a pipeline lining of this construction, no connection edges and/or regions of overlap of the lining material are present, and therefore no points of weakness in this regard are assumed in the state connected to the pipeline.

The at least one microwave-transmitting antenna can be a slot antenna or a monopole antenna or a patch antenna or a dipole antenna or a horn radiator.

It is furthermore possible that when forming a plurality of microwave-transmitting antennas, these are formed differently and can be formed in accordance with different types of microwave-transmitting antennas in conjunction with the high-frequency unit.

The at least one microwave-transmitting antenna can be actuated or actuatable by a radiation-emitting control unit. With the aid of a radiation-emitting control unit, the microwave power generated by the microwave-generator unit is forwarded to the microwave-transmitting antenna in a controlled and/or regulated manner. It is therefore possible to perform an adjustment in respect of the microwave power emitted by the microwave-transmitting antenna. With the aid of a so-called solid-state high-frequency unit or a solid-state microwave-generator unit, the frequency, the power and the high-frequency signal phases can be adjusted. In relation to the power, it is possible to perform a linear power adjustment or a pulse width adjustment or an adjustment of the supply voltage of the power supply. The independent adjustment of the high-frequency signal phases is advantageous or necessary especially with use of a plurality of coherent microwave-generator units.

The system preferably has a plurality of microwave-transmitting antennas, wherein these microwave-transmitting antennas are actuated or actuatable separately from one another by at least one radiation-emitting control unit. It is furthermore possible that the system has a plurality of radiation-emitting control units. In an embodiment of this construction of the invention, each microwave-transmitting antenna can be actuated or actuatable by a separate radiation-emitting control unit.

It is possible that the system allows the microwave-transmitting antennas to be controlled segment by segment, for example by means of amplifiers and/or splitters. The microwave-transmitting antennas in this case can be actuated separately from one another. This has corresponding advantages for the arrangement of a plurality of microwave-transmitting antennas. For example, a first microwave-transmitting antenna in the region of a (lateral) pipe connection can be supplied with less energy than a further microwave-transmitting antenna which is located at an opposite position in the pipe.

Furthermore, in an embodiment of the system of this construction, it is possible to control the power or the energy to be delivered by the particular microwave-transmitting antenna depending on detected ambient parameters and/or depending on a detected degree of damage to the at least partially cured plastics material.

The system can furthermore have at least one recording unit for storing ambient parameters and/or for storing the energy consumption and/or for storing process sequence data. These data can be used for example to document performed curing processes. It is furthermore possible, for example in the event that damage is present, to consult the original process sequence data and locate possible fault sources.

The system according to the invention in a further embodiment can have at least one air-cooling unit. It is possible to form an air-cooling unit on account of the design according to the invention of the system, especially on account of the possible use of solid-state microwave-generator units. In previously known systems for curing pipeline linings, water-cooling devices are necessary in order to achieve sufficient cooling. This is not necessary in accordance with the invention.

For example, it is possible to perform a cooling operation by means of compressed air. An air-cooling unit is much easier to use in comparison to a water-cooling device. The components necessary for this purpose are likewise easier to construct and are more easily handled. On account of the formation of solid-state microwave-generator units, it is sufficient in many applications to provide air cooling, especially compressed air cooling. In principle, however, it is also possible to use water cooling, which can also be implemented with the aid of solid-state microwave-generator units, if this is necessary on account of the application environment.

A further aspect of the invention relates to a method for curing and/or inspecting a pipeline lining positioned in a pipeline, wherein the pipeline lining has an outer plastics material layer and an inner fiber composite layer, wherein the fiber composite layer comprises a plastics material that is to be cured and/or that is at least partially cured.

The invention is based on the fact that the method according to the invention is carried out using a system according to the invention and at least parts of the system, especially a pipeline module, are/is introduced into the pipeline in such a way that these parts of the system are surrounded by the pipeline lining, especially spaced apart therefrom, wherein the plastics material of the fiber composite layer is cured on account of the microwaves emitted by the at least one microwave-transmitting antenna and/or the at least partially cured plastics material is inspected in respect of its degree of cross-linking.

With aid of the method according to the invention, it is now possible to provide both a method for curing and a method for inspecting a pipeline lining positioned in a pipeline, with said methods being able to be performed much more quickly than is known in accordance with the prior art.

Especially, on account of the method according to the invention, it is possible to be able to perform both a method for curing and a method for inspecting a pipeline lining using just one system.

It is possible that the degree of curing of the plastics material to be cured is set by controlling the at least one microwave-transmitting antenna by means of a radiation-emitting control unit. The emitted/the absorbed microwave energy is therefore adjustable by means of the radiation-emitting control unit. In a first approximation, the curing is initiated and supported more quickly and more completely with increasing microwave energy input per plastics material unit of area to be cured.

In a further embodiment of the method according to the invention, it is possible that, when forming a plurality of microwave-transmitting antennas, these are actuated separately from one another. This separate actuation can be achieved by means of single radiation-emitting control unit. Furthermore, it is possible that a plurality of radiation-emitting control units are formed, wherein for example one radiation-emitting control unit is formed per microwave-transmitting antenna.

This means, for example, that the microwave-transmitting antennas do not have to be arranged exactly in the middle or centrally in a pipe. With the aid of corresponding sensors and the values detected therewith, it is possible to respond by means of adapted radiating power to the different distances between a microwave-transmitting antenna and the resin to be cured.

The frequency and/or the microwave energy of the microwaves emitted by the at least one microwave-transmitting antenna can be set and/or controlled depending on the detected ambient parameters.

For example, the detected ambient parameter may be the ambient temperature and/or any provided side inflows and/or detected good or poor thermal coupling to the pipe. Furthermore, a dependent control can be implemented in the event that water is detected.

Especially, within the scope of the system according to the invention and/or the method according to the invention, a microwave radiation in the frequency range of 100 MHz to 6 GHz is used.

One of the ISM bands at 434 MHz or 915 MHz or 2.45 GHz or 5.8 GHz is preferably used.

In an especially preferred embodiment of the invention it is provided that the frequency and/or the microwave energy is/are set in such a way that the plastics material to be cured is acted on by such a microwave radiation energy that the plastics material to be cured reaches a temperature of 90° C.-110° C., especially 100° C.

The degree of cross-linking of the at least partially cured plastics material can be determined by means of an infrared sensor and the detection of the temperature change of the plastics material being cured. A reference measurement is preferably created, so that the local temperature conditions are measured before the curing process is performed. With the aid of the method according to the invention, it is thus possible to perform an inspection of the degree of cross-linking of the at least partially cured plastics material already just after the actual curing process. Any defective connection points and/or cured points can thus be remedied as quickly as possible.

It is possible that at least one microwave-transmitting antenna is realised discretely mechanically or on a printed circuit board.

In one embodiment of the invention, it is possible that a two-stage, especially a three-stage heating process is performed.

The two-stage, especially three-stage heating process is performed by means of at least one microwave-transmitting antenna. The multi-stage heating process is preferably performed by means of a plurality of microwave-transmitting antennas.

The heating process or the multi-stage heating process can also be referred to as a curing process or multi-stage curing process.

A first stage of the heating process causes a response to be triggered in the plastics material to be cured.

A second stage of the heating process is a controlled application of energy to the plastics material.

An optional third stage of the heating process can relate to a renewed application of energy to a portion of the pipeline lining.

With the aid of a third stage of the heating process it is possible to perform a renewed application of energy, for example following corresponding detection of a degree of cross-linking of the at least partially cured plastics material, if the detected degree of cross-linking is not yet sufficient.

The two-stage, especially three-stage heating process can be controlled depending on detected ambient parameters and/or depending on detected exothermic energy and/or depending on a/the detected degree of cross-linking of the at least partially cured plastics material. Especially, the control relates to the particular level of application of energy into the individual stages of the heating process. Furthermore, the control relates preferably to the decision as to whether a further stage of a heating process is performed.

With the aid of the method according to the invention it is possible for the frequency and/or the microwave energy and/or the duration of the application of microwaves to a pipeline lining to be provided section by section.

With the aid of the method according to the invention, especially with use of the system according to the invention, it is possible for the first time to sense in the method detailed information regarding the plastics materials to be cured and/or to translate said information accordingly. This information may be constituted by parameters such as glass transition temperatures, variations of the specific heat, and any remaining exothermic energies. These parameters correlate with the development of the curing of the plastics materials. The plastics materials are preferably resins, especially thermosetting polymers.

With the aid of the sensor unit it is possible to sense changes to the thermal properties of the plastics material, especially the polymer.

Especially, it is possible on account of the method according to the invention to sense corresponding parameters in situ, i.e. during the method and/or in the pipe, and to control the method accordingly on the basis of the sensed parameters. This relates especially to the control of at least one microwave-transmitting antenna.

The sensed parameters can be, for example, also the sensed moments in time in respect of gel or glass transitions of uncured or at least partially cured plastics materials.

It is furthermore possible to perform a data transfer, especially a remote monitoring, in the method according to the invention. A direct data comparison can be performed with the aid of a data transfer of this kind, and a control can be implemented, especially a control in the sense of remote maintenance.

With the aid of the method it is possible on the one hand to achieve quicker curing of the plastics materials.

It is furthermore additionally possible that a more exact curing is achieved and therefore corresponding curing defects, such as the forming of bubbles, burning of the plastics material, and inadequate degrees of cross-linking, are specifically overcome or avoided with the aid of the method according to the invention.

The invention will be explained in greater detail hereinafter on the basis of an exemplary embodiment with reference to the appended schematic drawing.

FIG. 1 shows a possible embodiment of the system 10 according to the invention for curing and/or inspecting a pipeline lining. The system 10 according to the invention according to the FIGURE is already located in the pipeline 20. In addition, a pipeline lining 30 is already located in the pipeline 20.

The pipeline lining 30 bears against the inner face of the pipeline 20. The pipeline lining 30 consists in turn of an outer plastics material layer and an inner fiber composite layer. The fiber composite layer comprises a plastics material which is to be cured and/or which is at least partially cured.

In the shown example, a pipeline module corresponds to the entire system 10.

The system 10 comprises at least one high-frequency unit 40, which in turn comprises at least one microwave-generator unit 41. Furthermore, the high-frequency unit 40 in the shown example comprises two microwave-transmitting antennas. Alternatively, it is possible that the high-frequency unit 40 is formed structurally separately. It is thus possible that the microwave-generator unit 41 remains outside the pipeline 20.

In the present exemplary embodiment, the microwave-transmitting antennas 42 are transported by means of a transporting device 60. The transporting device 60 has a front portion 61 and a rear portion 62. The front portion 61 is understood to be the part of the system 10 or of the transporting device 60 that is arranged at the front or first in the movement direction R of the system 10.

By contrast, the rear portion 62 is understood to be the portion of the transporting device 60 that is arranged at the rear or last in the movement direction R. The transporting device 60 can comprise further, intermediate portions. In the present case, the front portion 61, the rear portion 62 and the traction wires 66 and 66' serve to transport the system 10.

Leg elements 63 are formed both on the front portion 61 and the rear portion 62. Rollers 64 are formed at the ends of the leg elements 63 and point in the direction of the pipeline 20. The system 10 is therefore moved and centred within the pipeline 20.

The front traction wire 66 is attached to a fastening device 67. The fastening device 67 can be an eyelet. By contrast, the rear traction wire 66' is arranged on the fastening device 67'.

The system 10 is transported into the pipeline 20 by means of the front traction wire 66. The system 10 can be removed from the pipeline 20 with the aid of the rear traction wire 66'.

The leg elements 63 are preferably prestressed. This can be achieved for example by means of a spring (not shown). With the aid of a prestress of the leg elements 63, it is possible that the diameters formed by the leg elements 63 can be adapted to the diameters or inner diameters of the pipeline 20.

A communications line 80 can additionally be attached to the rear portion 62. This communications line 80 serves for power supply and for data exchange. The data exchange is necessary especially in order to control the system 10 during the state in which the system is located in the pipeline 20.

In the FIGURE it can also be seen that the system 10 has a radiation-emitting control unit 45. This radiation-emitting control unit 45 serves to regulate the microwaves RF emitted by the microwave-transmitting antennas 42.

The system 10 furthermore comprises a sensor unit 50. This is a component that comprises a plurality of sensors. The component 50 has two infrared sensors 51. For example, the degree of cross-linking of the at least partially cured plastics material can be detected with the aid of the emitted infrared radiation IR. This detection is based on the sensing of the temperature change of the plastics material to be cured.

In addition, the sensor unit 50 has a temperature sensor 52 which measures the ambient temperature.

A diameter-sensing unit 65 is furthermore formed on the front portion 61. Data of this kind are determined with the aid of this diameter-sensing unit and are sent via the line 81 to the radiation-emitting control unit 45. The microwaves RF to be emitted can be adapted or regulated depending on the determined diameter values.

LIST OF REFERENCE SIGNS 10 system
20 pipeline
30 pipeline lining
40 high-frequency unit
41 microwave-generator unit
42 microwave-transmitting antenna
45 radiation-emitting control unit
50 sensor unit
51 infrared sensor
52 temperature sensor
60 transporting device
61 front portion
62 rear portion
63 leg element
64 roller
65 diameter-sensing unit
66, 66' traction wire
67, 67' fastening device
80 communications line
81 line
R movement direction
RF microwave
IR infrared radiation

The invention claimed is:

1. A method for curing and/or inspecting a pipeline lining positioned in a pipeline, wherein the pipeline lining comprises an outer plastics material layer and an innermost fibre composite layer, wherein the fibre composite layer comprises a plastics material which is to be cured and/or which is at least partially cured, wherein the method is performed using a system comprising at least one high-frequency unit which comprises at least one microwave-generator unit and at least one microwave-transmitting antenna for curing a plastics material which is to be cured, at least the at least one microwave-transmitting antenna being movable in the pipeline by means of a transporting device, wherein the at least one microwave-generator unit is a solid-state microwave-generator unit and at least parts of the system are introduced into the pipeline in such a way that these parts of the system are surrounded by the pipeline lining, wherein the fibre composite layer is disposed between the at least one microwave-transmitting antenna and the outer plastics material layer, and wherein the plastics material of the fibre composite layer is cured on account of the microwaves emitted by the at least one microwave-transmitting antenna and/or the at least partially cured plastics material is inspected in respect of its degree of cross-linking, and wherein a multi-stage heating process is performed by a plurality of microwave-transmitting antennas, a first stage of the heating process causing a response to be triggered in the plastics material to be cured and a second stage of the heating process being a controlled application of energy to the plastics material following a corresponding detection of a degree of cross-linking of the at least partially cured plastics material.

2. The method according to claim 1, characterised in that the degree of curing of the plastics material which is to be cured is set by controlling the at least one microwave-transmitting antenna by means of a radiation-emitting control unit.

3. The method according to claim 1, characterised in that the frequency and/or microwave energy of the microwaves emitted by the at least one microwave-transmitting antenna is set and/or controlled depending on detected ambient parameters.

4. The method according to claim 1, characterised in that the degree of cross-linking of the at least partially cured plastics material is determined by means of an infrared sensor and a detection of a temperature change of the plastics material being cured.

5. The method according to claim 1, characterised in that diameter values of the pipeline and/or of the pipeline lining are determined by means of a diameter-sensing unit.

6. The method according to claim 1, characterised in that a plurality of microwave-transmitting antennas are actuated separately from one another.

7. A system for curing and inspecting a pipeline lining positioned in a pipeline, the pipeline lining comprising an outer plastics material layer and an inner fibre composite layer, the fibre composite layer comprising a plastics material which is to be cured and/or which is at least partially cured, wherein the system includes at least one high-frequency unit which comprises at least two microwave-generator units and at least two microwave-transmitting antenna for curing a plastics material which is to be cured, at least the at least one microwave-transmitting antenna being movable in the pipeline adjacent the fibre composite layer by means of a transportation device including a front unit and a rear unit with the at least one high-frequency unit disposed between the at least one microwave-transmitting antenna and the outer plastics material layer, forming the innermost layer of the pipeline lining, the system further comprises a sensor unit including at least one infrared sensor and optionally one or more of a temperature sensor a pressure sensor a moisture sensor a position sensor a travel measurement sensor, and/or a gyro sensor, wherein the sensor unit senses changes to thermal properties of the plastics material layer and the system adjusts transmissions from at least one microwave-transmitting antenna in response to the changes.

8. The system according to claim 7 characterised in that the high-frequency unit comprises at least two microwave-generator units and/or at least one microwave-generator unit generates 100-1000 W of microwave power, and/or the high-frequency unit comprises at least three microwave-transmitting antennas.

9. The system according to claim 7, characterised in that the front portion and/or the rear portion comprises at least two leg elements.

10. The system according to claim 7, characterised by at least one camera, which is formed in the region of the front portion, and/or at least one camera is formed in the region of the rear portion.

11. The system according to claim 7, characterised in that the transporting device has at least one traction wire, at least one fastening device being configured for attachment of the traction wire.

12. The system according to claim 11, characterised by a diameter-sensing unit.

13. The system according to claim 7, characterised in that the plastics material to be cured is a thermally curing plastics material and/or the pipeline lining is hose-like and/or the fibre composite layer comprises glass fibres.

14. The system according to claim 7, characterised in that the at least one microwave-transmitting antenna is a slot antenna or a monopole antenna or a patch antenna or a dipole antenna or a horn radiator.

15. The system according to claim 7, characterised in that the at least one microwave-transmitting antenna is actuated or actuatable by a radiation-emitting control unit.

16. The system according to claim 7, characterised by a plurality of microwave-transmitting antennas, which are actuated or actuatable separately from one another by at least one radiation-emitting control unit.

17. The system according to claim 7, characterised by a recording unit for storing ambient parameters and/or the energy consumption and/or process sequence data.

18. The system according to claim 7, characterised by at least one air-cooling unit.

19. The system according to claim 7, wherein the pipelining lining consists of the fibre composite layer and the plastics material layer.

20. The system according to claim 7, wherein the infrared sensor measures the surface temperature of the pipeline lining to inspect the curing process and the sensed temperature is stored.

21. The system according to claim 7, wherein the sensor comprises at least one of a position sensor and/or a travel measurement sensor and at least one of a temperature sensor and/or a pressure sensor and/or a moisture sensor.

22. The system according to claim 7, wherein the microwave-transmitting antennas are actuatable by separate radiation emitting control units.

* * * * *